(12) United States Patent
Steckelberg et al.

(10) Patent No.: US 6,916,350 B2
(45) Date of Patent: Jul. 12, 2005

(54) DYE MIXTURE OF WATER-SOLUBLE FIBER-REACTIVE AZO DYES, METHOD FOR THE PRODUCTION AND USE THEREOF

(75) Inventors: Joachim Steckelberg, Brunsbüttel (DE); Werner Russ, Flörsheim-Wicker (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 62 days.

(21) Appl. No.: 10/240,362

(22) PCT Filed: Mar. 31, 2001

(86) PCT No.: PCT/EP01/03700

§ 371 (c)(1),
(2), (4) Date: Sep. 30, 2002

(87) PCT Pub. No.: WO01/77232

PCT Pub. Date: Oct. 18, 2001

(65) Prior Publication Data

US 2003/0145396 A1 Aug. 7, 2003

(30) Foreign Application Priority Data

Apr. 8, 2000 (DE) .......................... 100 17 555

(51) Int. Cl.⁷ .................. C09B 67/22; C09B 62/44; D06P 1/382
(52) U.S. Cl. ................................. 8/549; 8/641
(58) Field of Search ................... 8/549, 641

(56) References Cited

U.S. PATENT DOCUMENTS

| | | | | |
|---|---|---|---|---|
| 5,200,511 A | * | 4/1993 | Loeffler et al. | 534/634 |
| 5,428,141 A | | 6/1995 | Herd et al. | 534/638 |
| 5,556,435 A | | 9/1996 | Russ et al. | 8/549 |
| 5,831,038 A | * | 11/1998 | Reichert | 534/612 |
| 5,837,827 A | | 11/1998 | Reichert et al. | 534/618 |
| 5,892,006 A | | 4/1999 | Tzikas | 534/634 |
| 6,090,164 A | | 7/2000 | Steckelberg et al. | 8/549 |
| 6,391,066 B1 | * | 5/2002 | Steckelberg et al. | 8/549 |

FOREIGN PATENT DOCUMENTS

| | | |
|---|---|---|
| CA | 2400920 * | 8/2001 |
| EP | 0094055 | 5/1983 |
| EP | 0681007 | 4/1995 |
| EP | 0719841 | 12/1995 |
| EP | 0775732 | 11/1996 |
| WO | WO 01/62856 * | 8/2001 |

* cited by examiner

Primary Examiner—Margaret Einsmann
(74) Attorney, Agent, or Firm—Connolly Bove Lodge & Hutz LLP

(57) ABSTRACT

Dye mixtures including one or more azo dyes of the general formula (1) and one or more azo dyes of the general formula (2)

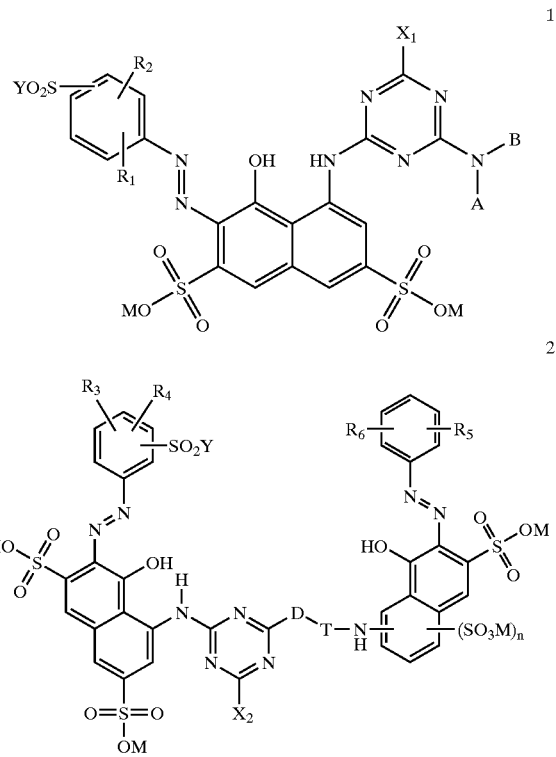

are prepared and used for dyeing or printing hydroxyl- and/or carboxamido-containing material, preferably fiber material.

16 Claims, No Drawings

DYE MIXTURE OF WATER-SOLUBLE FIBER-REACTIVE AZO DYES, METHOD FOR THE PRODUCTION AND USE THEREOF

Dye mixture comprising water-soluble fiber-reactive azo dyes, preparation thereof and use thereof This invention relates to the technical field of fiber-reactive azo dyes.

EP-A 775732 and EP-A 94055 disclose dyes of the general formulae 1 and 2. However, these dyes have certain application defects, for example an excessive dependence of the color yield on changing dyeing parameters in the dyeing process, or an insufficient or unlevel color build-up on cotton (good color build-up results from the ability of a dye to produce a correspondingly stronger dye and from an increased dye concentration in the dyebath). Possible consequences of these shortcomings are poor reproducibilities for the dyeings which are obtainable.

However, it is particularly important to obtain dyeings having a good color yield, i.e., dyeings whose depth of shade is very high in relation to the amount of dye used, because of the coloring property of the dye itself (high absorbance) and because of the dyeing characteristics of this dye, such as good affinity and high yield of fixation. When mixtures of dyes having a certain color yield are used, the color yield of this mixture of dyes will generally be the average of the color yields of the individual dyes, which is why the color yield of a mixture of, for example, two dyes will be less than the color yield obtained when the dye having the larger color yield property is used as the only dye but in the total amount of the two individual dyes.

It has now been found that the color strength of the hereinbelow described dye mixtures according to the invention is surprisingly higher than the sum total of the color strengths afforded by the individual dyes in the mixture. This synergistic effect also shows itself in improved build-up characteristics on the part of the mixture of the invention compared with the individual dyes in the mixture.

True, synergistic mixtures are already known from EP-A 681002, but the mixtures described therein have certain application defects, for example an unlevel build-up in the cold pad-batch process, and also the staining of adjacent fabric, especially polyester, in continuous dyeing by the pad-steam process. This staining is undesirable because it means that, in commercial practice, the dyed material has to be subjected to several energy- and media-intensive (water) cleaning operations to remove the stains.

The present invention, then, provides a way of reducing this undesirable staining while at the same time improving the build-up characteristics of the mixture according to the invention compared to the individual dyes in the mixture. These mixtures are notable for very good in-service fastnesses.

The present invention accordingly provides dye mixtures comprising one or more azo dyes of the general formula (1) and one or more azo dyes of the general formula (2)

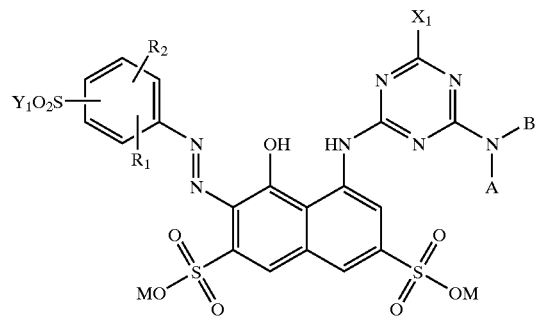

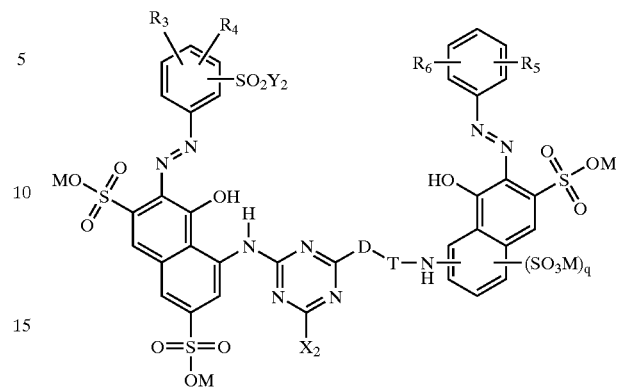

where

M is a hydrogen atom, an ammonium ion or the equivalent of an alkali or alkaline earth metal, $X_1$ is fluoro, chloro, alkoxy, hydroxyl, cyanamido, amino, anilino, anilinesulfonic acid, anilinedisulfonic acid, toluidine, anisole, or an unsubstituted or hydroxyl-, sulfo- or sulfato-substituted alkylamino, $X_2$ has any of the meanings of $X_1$ $Y_1$ and $Y_2$ are each ethenyl or a moiety of the formula $CH_2CH_2Z$, where Z is a moiety that is eliminable by the action of alkali, $R_1$, $R_2$, $R_3$, $R_4$, $R_5$ and $R_6$ are independently hydrogen, alkyl, alkoxy, sulfo, hydroxyl, cyano, chloro or bromo, A is hydrogen or $C_1$–$C_6$-alkyl, with or without sulfo, hydroxyl or sulfato substitution or aniline with or without sulfo or halogen substitution, B is hydrogen, alkyl, $CH_2CH_2SO_2Y$, alkyl with or without $SO_2Y$, —$OCH_2CH_2SO_2Y$ or —$SO_3M$ substitution or phenyl with or without substitution by up to three substituents selected for example from the group consisting of alkyl, alkoxy, sulfo, hydroxyl, cyano, chloro, bromo and $SO_2Y$, where M and Y are each as defined above, A-N-B alternatively represents cyclic amines, for example morpholine or piperazine, D-T is a direct bond or else T is a sym-triazine substituted in position 2 by $X_3$, where $X_3$ has any of the meanings of $X_1$, and D is an alkylenediamino bridge of the general formulae 3, 4, 5 and 6:

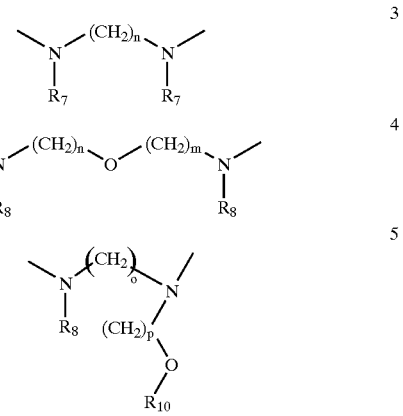

-continued

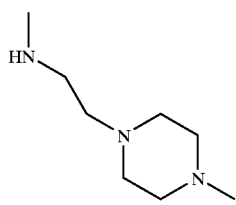

where
n, m, o and p are each 1–8,
q is selected from the group consisting of zero and one,
$R_7$, $R_8$, and $R_9$ are independently $C_1$–$C_4$alkyl, and
$R_{10}$ is hydrogen or $SO_3M$.

In the general formulae indicated above and hereinbelow, the individual symbols, whether of different or identical designation within any one general formula, may have identical or different meanings under their definition.

Generally the azo dye of the general formula (1) and the azo dye of the general formula (2) are present in the mixture in a mixing ratio of 90:10% by weight to 10:90% by weight, preferably in a ratio of 70:30% by weight to 30:70% by weight. Particularly preferably they are present in the mixture in a ratio of 65:35 to 35:65% by weight.

$X_1$ is preferably chloro or fluoro.

$C_1$–$C_4$-Alkyl $R_1$, $R_2$, $R_3$ $R_4$, $R_5$, $R_6$, $R_7$, $R_8$ or $R_9$ may be straight-chain or branched, and ethyl and especially methyl are preferred.

$R_1$ $R_2$, $R_3$ $R_4$, $R_6$ are each preferably selected from the group consisting of hydroxyl, methyl, methoxy and sulfo and are each particularly preferably hydrogen.

$R_5$ is particularly preferably methyl, methoxy or sulfo.

D is preferably 1,3- to 1,6-alkylenediamine, 1,5-diamino-3-oxypentane and is particularly preferably 3-(β-hydroxyethyl)pentane-1,5-diamine. T is preferably 2-chloro or 2-fluoro-1,3,5-triazinediyl. Preferably D-T is a direct bond Preferred substituents for phenyl B are alkyl, alkoxy, sulfo, hydroxyl, cyano, chloro, bromo or $SO_2Y$, and for alkyl B —$SO_2Y$, $OCH_2CH_2SO_2Y$ and —$NHCH_2CH_2SO_3M$, where M and Y are each as defined above.

An alkali-eliminable moiety Z is in particular sulfato of the formula —$OSO_3M$, thiosulfato of the formula —$SSO_3M$, acetyloxy of the formula —$OCOCH_3$, phosphate of the formula $OPO(OM)_2$ and chloro, M being as defined above.

The —$SO_2Y$ group is preferably meta or para to the azo group. The dye mixtures of the invention can be present as a preparation in solid or in liquid (dissolved form). In solid form, they generally include the electrolyte salts customary for water-soluble and especially for fiber-reactive dyes, such as sodium chloride, potassium chloride and sodium sulfate, and may further include the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, or small amounts of siccatives; when they are present in a liquid, aqueous solution (including the presence of thickeners of the type customary in print pastes) they may also include substances which ensure a long life for these preparations, for example mold preventatives.

Generally the dye mixtures of the invention are present as dye powders containing 10 to 80% by weight, based on the dye powder or the preparation, of an electrolyte salt which is also referred to as a standardizing agent. These dye powders may additionally include the aforementioned buffer substances in a total amount of up to 10% by weight, based on the dye powder. When the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 10% by weight, preferably up to 2% by weight.

The dye mixtures of the invention are preparable in a conventional manner, for instance by mechanically mixing the individual dyes known from the above-mentioned EP-As in solid or in liquid form in the requisite proportions, or by synthesis by means of the customary diazotization and coupling reactions and conversion reactions with the halotriazine component using corresponding mixtures of such components in a manner known to one of ordinary skill in the art and using the requisite quantitative proportions.

Synthesis may be effected, for example, by reacting a 2,4,6-trihalotriazine, especially 2,4,6-trichloro- or 2,4,6-trifluoro-triazine, first in a conventional manner with 1-amino-8-naphthol-3,6-disulfonic acid and then with a diazonium salt prepared in a well-known manner from an amine of the general formula (3A) or (3B)

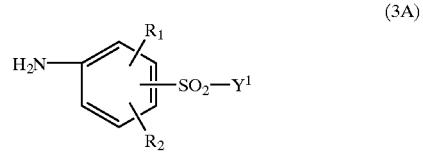

(3A)

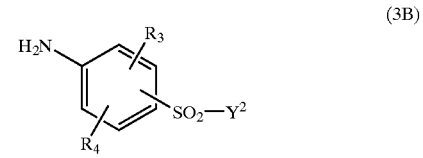

(3B)

where $R_1$, $R_2$, $R_3$, $R_4$, $Y_1$ and $Y_2$ are each as defined above, then reacting the reaction product from the reaction with a diazotized amine of the formula (3A) by reaction with one or more amino compounds of the general formula A-NH-B, where A and B are each as defined above, or to prepare the component of the general formula (2) introducing the fragment D-T in a known manner in the reaction product from the reaction with a diazotized amino compound of the formula (3B), then reacting this reaction product with an amine of the general formula (3C)

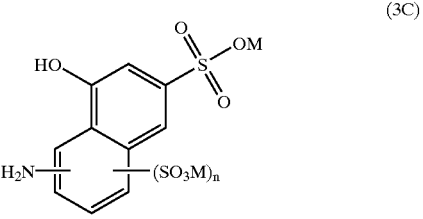

(3C)

in a conventional manner and coupling with the diazonium salt of the amines of the general formula (3D) in a known manner to form the bisazo dye.

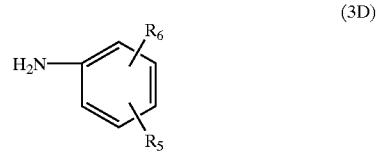

(3D)

Dyes of the general formula (1) and (2) where $X_1$ and $X_2$ are not halogen are converted by reacting the mixture with the compounds $HOR_3$ or $HNR_3R_4$ in a conventional manner, for example at a temperature between 10 and 100° C., preferably between 40 and 80° C., and at a pH between 3 and 7, preferably between 4 and 5.

The separation from their synthesis solution of the chemically prepared dye mixtures of the invention can be effected according to generally known methods, for example either by precipitating from the reaction medium by means of electrolytes, for example sodium chloride or potassium chloride, or by evaporating or spray-drying the reaction solution, in which case this reaction solution may have a buffer substance added to it.

The dye mixtures of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the solutions of the dye mixtures of the invention that are obtained in the synthesis of the azo compounds, if appropriate after addition of a buffer substance and if appropriate after concentrating or diluting, can be used directly as liquid preparation for dyeing.

The present invention thus also relates to the use of the dye mixtures of the invention for dyeing or printing these materials, or rather to processes for dyeing or printing these materials in a conventional manner, by using a dye mixture of the invention as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, polyamide-6,6, polyamide-6, polyamide-11 and polyamide-4.

The dye mixtures of the invention can be applied to and fixed on the substrates mentioned, especially the fiber materials mentioned, by the application techniques known for water-soluble dyes, especially fiber-reactive dyes. For instance, on cellulose fibers they produce by the exhaust method from a long liquor using various acid-binding agents and optionally neutral salts, such as sodium chloride or sodium sulfate, dyeings having very good color yields which are improved compared with the individual dyes. Application is preferably from an aqueous bath at temperatures between 40 and 105° C., optionally at a temperature of up to 130° C. under superatmospheric pressure, and optionally in the presence of customary dyeing auxiliaries.

One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding process likewise provides excellent color yields and very good color build-up on cellulose fibers, the dyes being allowed to become fixed on the material by batching at room temperature or at elevated temperature, for example at up to 60° C., by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print color and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colorists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention dye the materials mentioned, preferably fiber materials, in bright red to bluish red shades.

The examples hereinbelow serve to. illustrate the invention. Parts and percentages are by weight, unless otherwise stated. Parts by weight relate to parts by volume as the kilogram relates to the liter. The compounds described in the examples in terms of a formula are indicated in the form of free acids; in general these dyes are prepared and isolated in the form of their salts, preferably sodium or potassium salts, and used for dyeing in the form of their salts.

EXAMPLES 1–5

Preparation of individual components of dye mixtures of invention:

a) 19 parts of cyanuric chloride are suspended in 500 parts of water and 100 parts of ice. 32 parts of 1-amino-8-hydroxynaphthalene-3,6-disulfonic acid are added and the batch is stirred at 0–20° C. and pH 1.5 to 3.5 for about 2 hours.

b) 28 parts of the sodium salt of 4-(β-sulfatoethylsulfonyl) aniline are dissolved in 200 parts of water at pH 6–7. 7 parts of sodium nitrite are added, and the solution is added dropwise to a mixture of 20 parts of concentrated hydrochloric acid, 100 parts of ice and 50 parts of water. The batch is subsequently stirred at 0–5° C. for 2 hours. Excess nitrite is decomposed with sulfamic acid.

c) The diazo compound from b) is added dropwise to the reaction mixture from a) while a pH between 4 and 7 is maintained with 20% sodium carbonate solution.

d) 16 parts of aniline-3-sulfonic acid are then added at pH 5–7 and at a temperature of between 20–60° C. Drying under reduced pressure affords the mixture component (A):

A

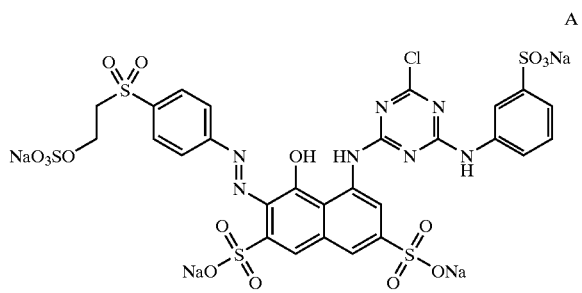

e) 20 parts of 1-methoxy-4-amino-3-sulfobenzene are diazotized similarly to b) and coupled with a suspension of a) at pH 4–7 and 10–20° C. while the pH is maintained with 10% sodium carbonate solution. 30 parts of 1-amino-8-hydroxy-naphthalene-3,6-disulfonic acid are added while the batch is warmed to 20–40° C. and the pH is maintained at 4–6 with 10% sodium carbonate solution.

f) The reaction mixture from e) is admixed with a diazo mixture according to b). Drying affords the mixture component B:

B

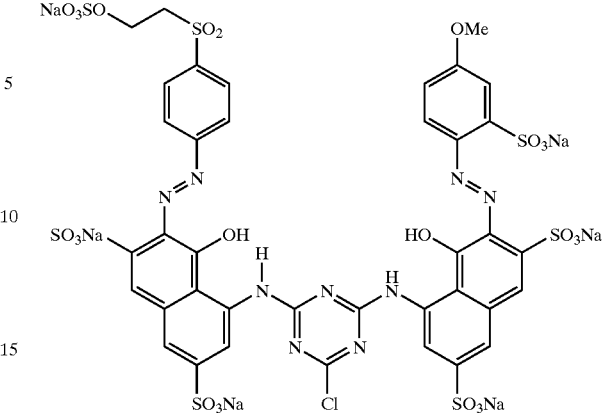

The respective mixture components are dissolved in 2 liters of water, as per the table which follows and spray dried.

| Example | Fractions of A | Fractions of B |
| --- | --- | --- |
| 1 | 100 | 100 |
| 2 | 70 | 50 |
| 3 | 70 | 100 |
| 4 | 100 | 70 |
| 5 | 60 | 40 |

EXAMPLES 6–10 a) The reaction mixture described under c) in Examples 1–5 is admixed with 144 parts of 1-methylamine-2-vinylsulfonylethane at pH 4–6 and 20–40° C. This provides a solution of mixture component C:

C

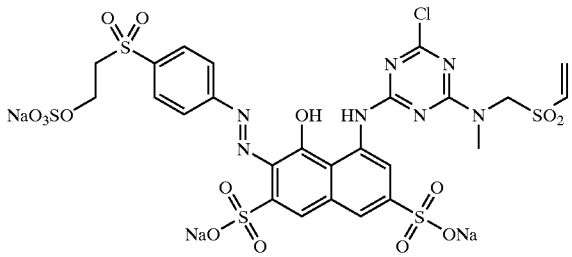

b) A neutral solution of 22 parts of 1-sulfo-3-methoxy-2-methyl-4-aniline in 200 ml of water is admixed with 7 parts of sodium nitrite and added dropwise to an ice-cooled mixture of 50 parts of concentrated hydrochloric acid and 100 g of ice. Excess nitrite is then decomposed as under Examples 1–5.

c) Solution a) is added dropwise at pH 7 and 0° C. to a solution of 31 g of 2-amino-1,7-disulfo-5-naphthol while the pH is maintained with 15% sodium carbonate solution.

d) Separately, 36.8 parts of cyanuric chloride in 200 parts of water are admixed at 0° C. with 80 parts of 1,4-diaminobutane and stirred at pH 2–3 and 0° C. for 2 hours. The mixture is admixed with 31 parts of 1-amino-8-hydroxynaphthalene-2,7-disulfonic acid and after about 1 to 3 hours solution c) is added dropwise and the batch is adjusted to pH 5–6. This is followed by warming to 20–40° C.

e) 31 parts of the sodium salt of 5-(β-sulfatoethylsulfonyl)-2-methoxyaniline are dissolved in 200 parts of water at pH 6–7. 7 parts of sodium nitrite are added and the solution is added dropwise to a mixture of 20 g of concentrated hydrochloric acid, 100 g of ice and 50 g of water. The batch is subsequently stirred at 0–5° C. for 2 hours. Excess nitrite is decomposed with sulfamic acid.

f) The diazo solution from e) is added dropwise to the solution from d) at pH 4–7 while the pH is maintained with sodium carbonate solution. This affords a solution of mixture component D:

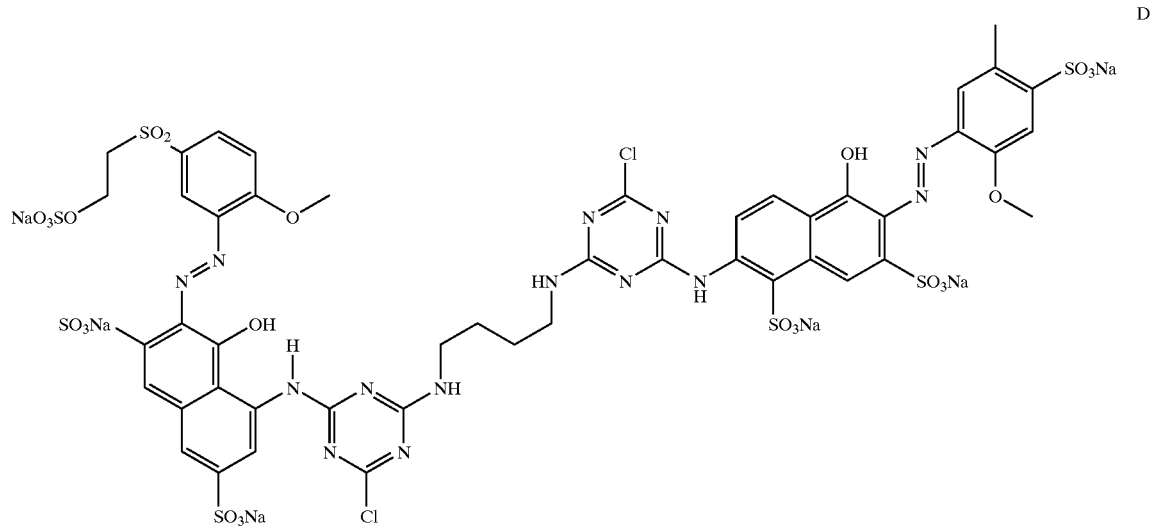

Components C and D are mixed as described under Example 1.

| Example | Mixture component C | Mixture component D |
|---------|---------------------|---------------------|
| 6 | 100 | 100 |
| 7 | 70 | 50 |
| 8 | 70 | 100 |
| 9 | 100 | 70 |
| 10 | 60 | 40 |

EXAMPLE 11

100 parts of mixture component A and 100 parts of mixture component D are mixed in a powder mill.

EXAMPLE 12

The mixture of Example 11 is dissolved in 500 parts of water at pH 7 and admixed with 50 parts of morpholine while the pH is maintained with 20% sodium carbonate solution. 100 parts of sodium chloride are added, and the precipitated dye is filtered off with suction. This affords a mixture of:

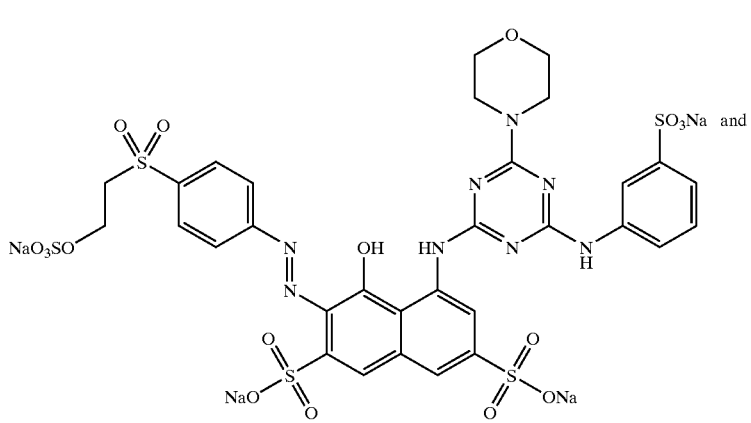

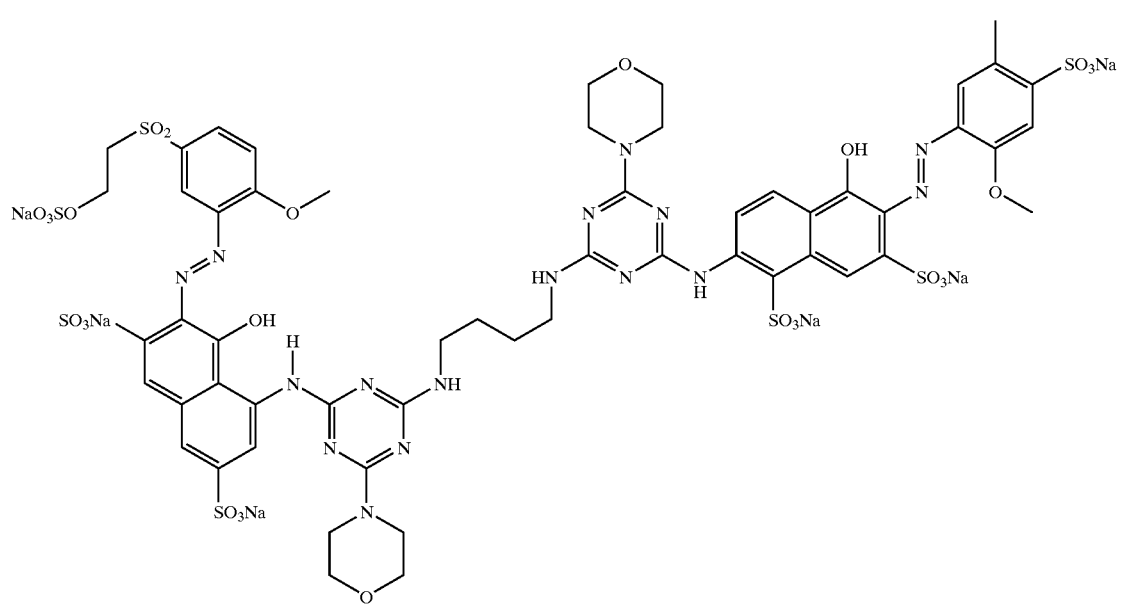
F
EXAMPLES 13–183
The following mixture components conforming to the general formula 1 were synthesized on the lines of Examples 1–12:
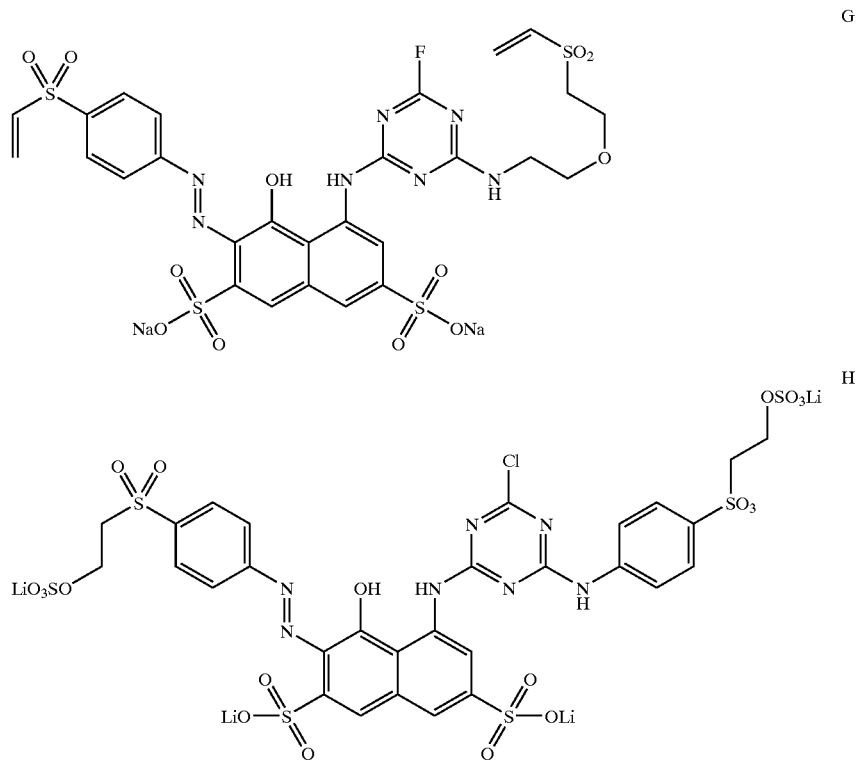
G
H -continued
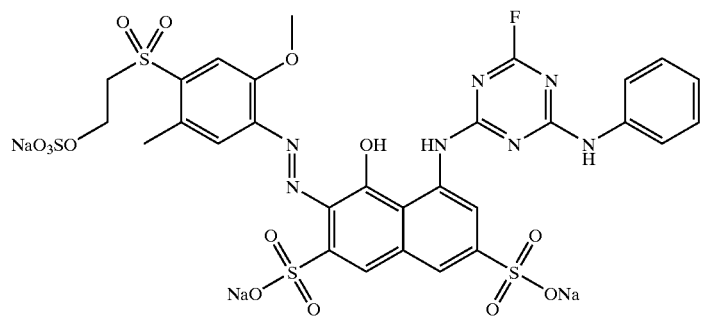
I
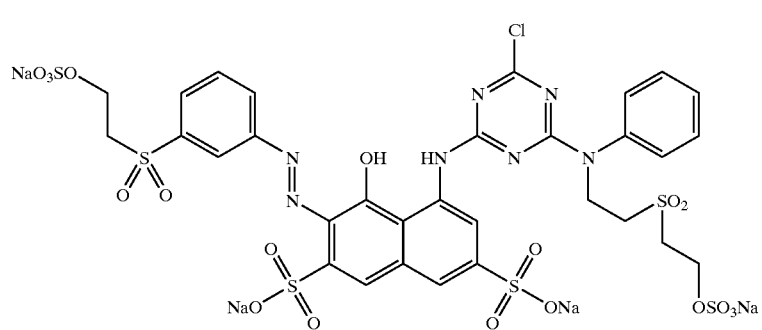
J
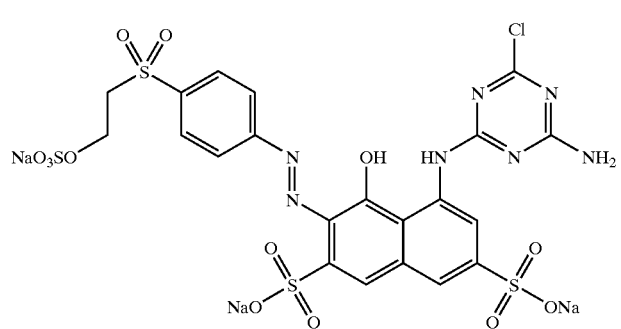
K
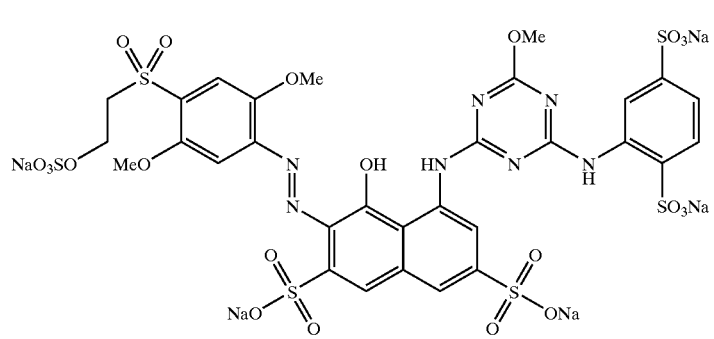
L M
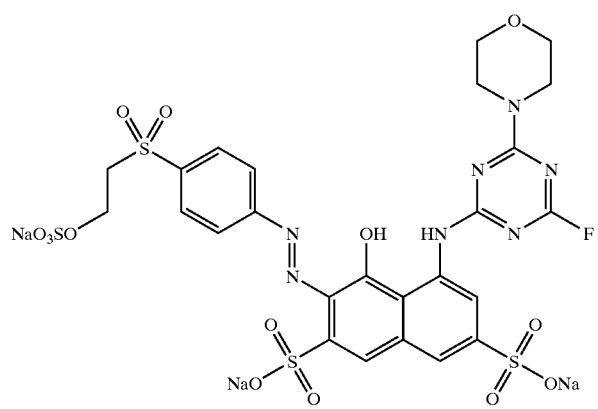
Dyes of the general formula 2 of the mixture according to the invention are for example:
O
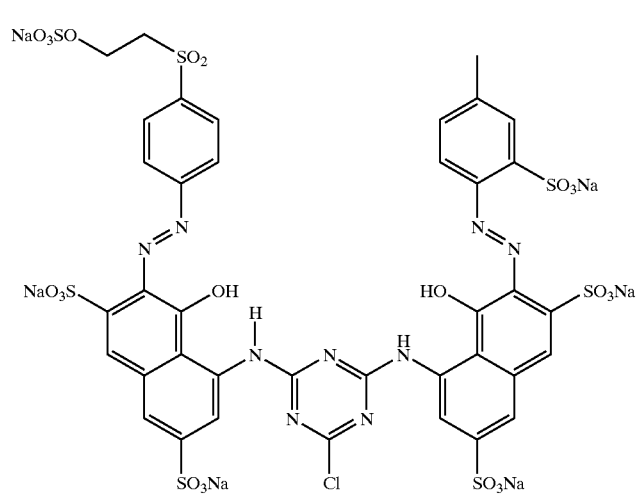
P
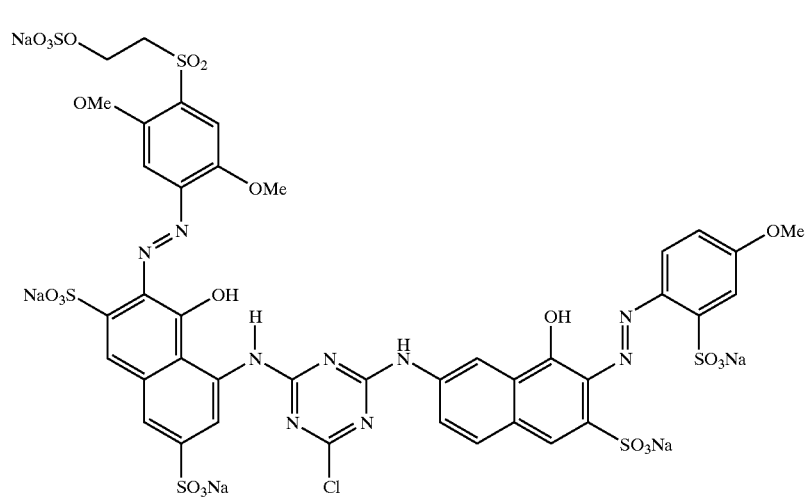

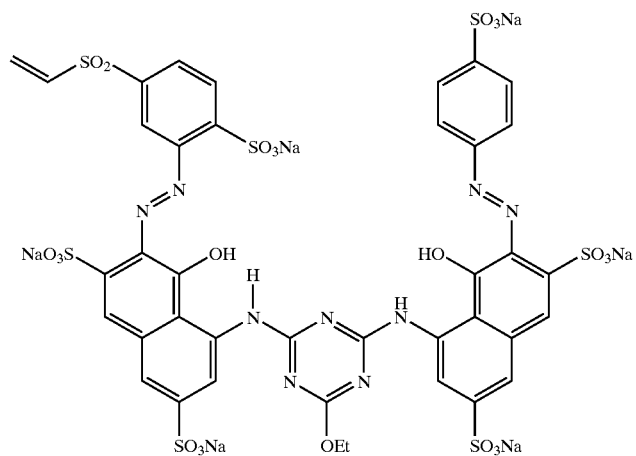
Q
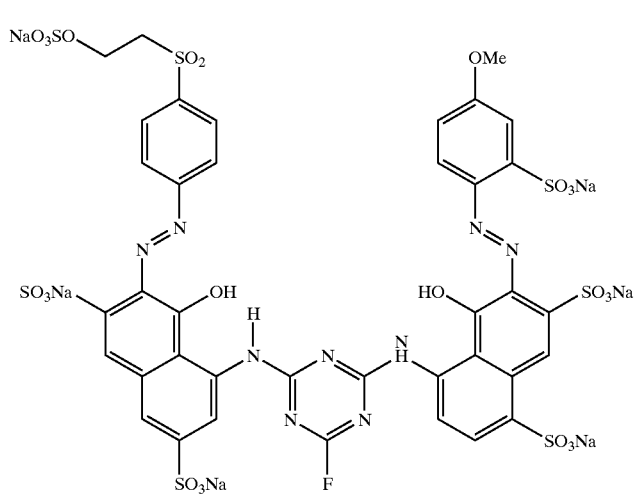
U
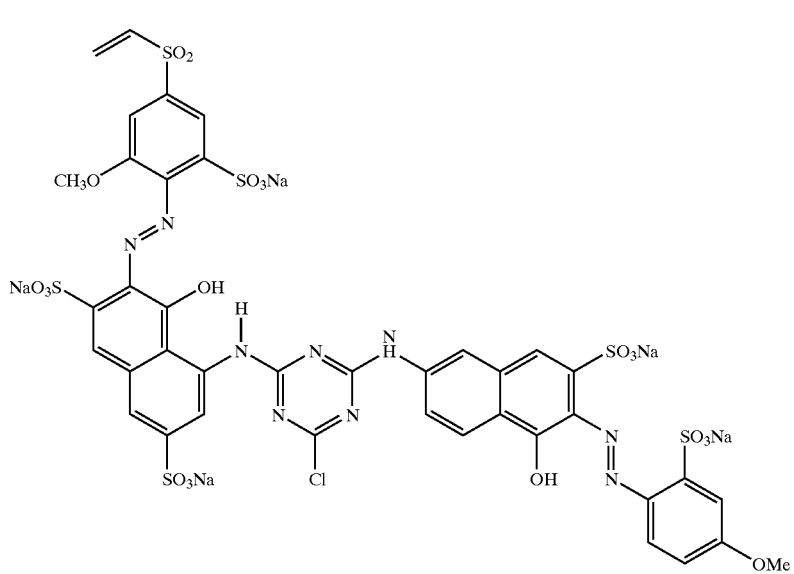
R

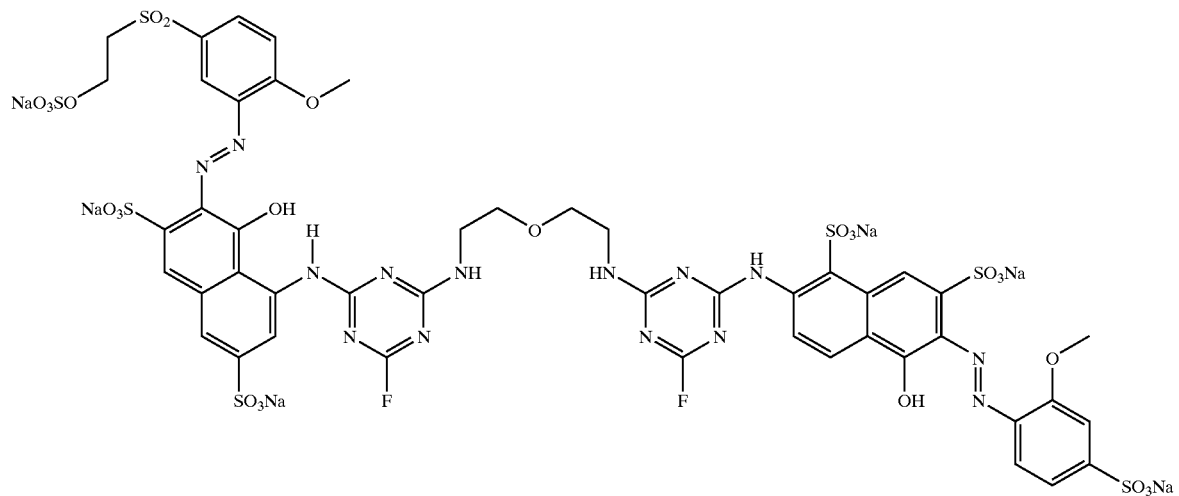
S
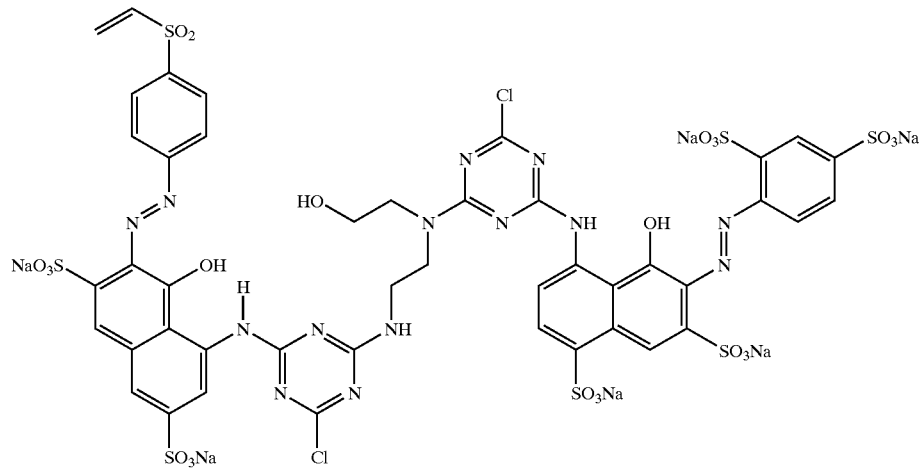
T
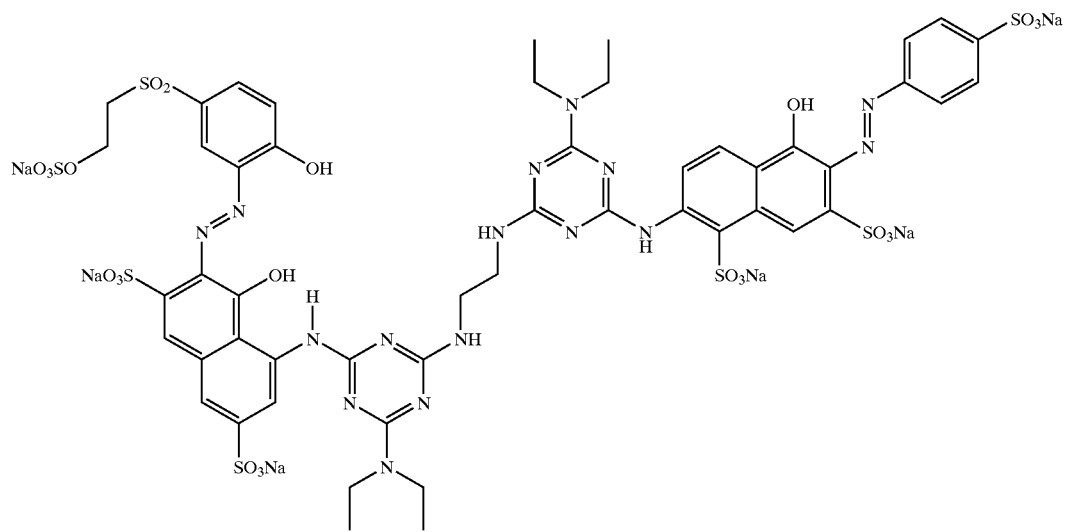
V

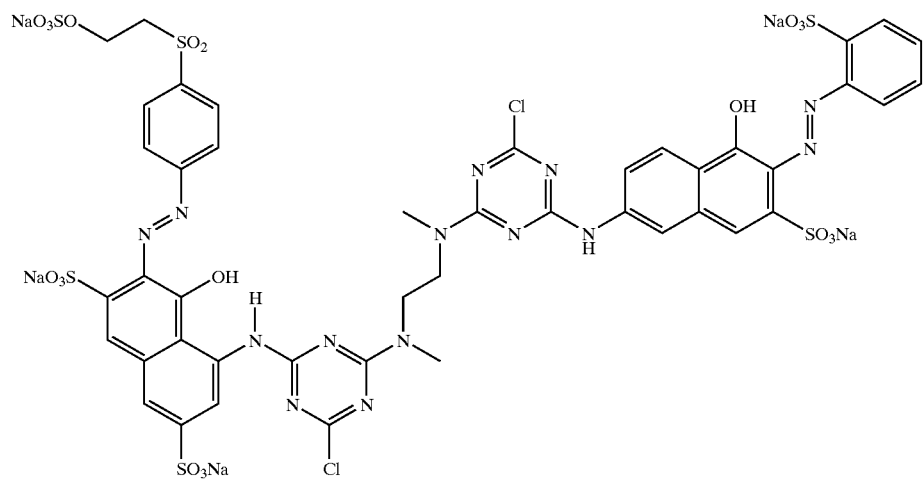
W
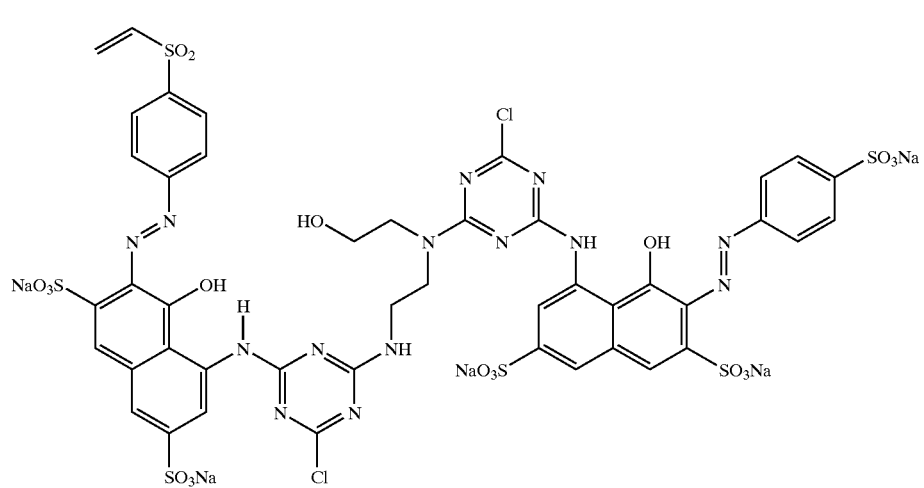
X
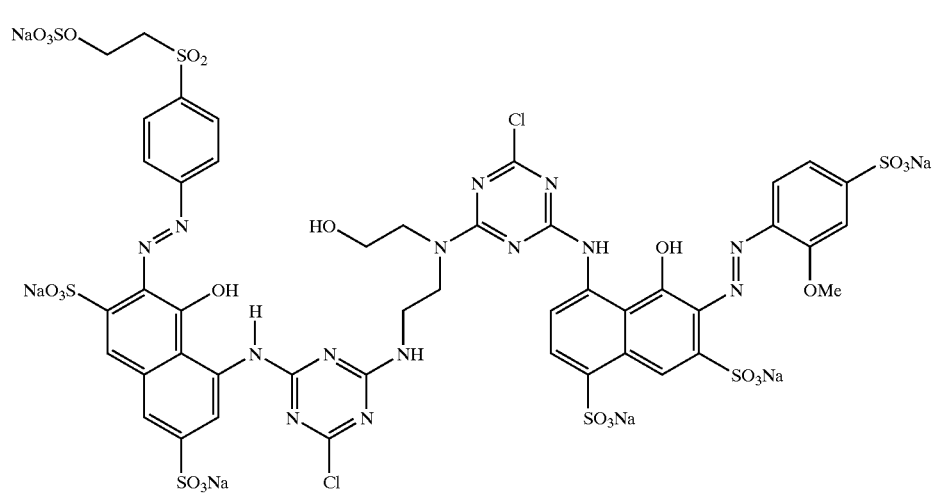
Y

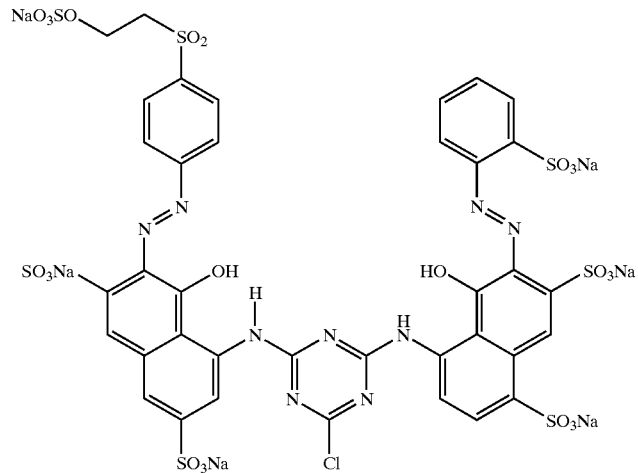

Components A, C, E, G–M, which correspond to the dyes of the general formula 1 according to the invention, were mixed in a mechanical mixer with components B, D, F, N–Z, which correspond to the inventive dyes of the general formula 2, according to the table which follows.

| Example | Component 1 | Component 2 | Ratio |
|---|---|---|---|
| 13 | A | N | 1:1 |
| 14 | A | N | 2:1 |
| 15 | A | O | 1:2 |
| 16 | A | O | 1:1 |
| 17 | A | P | 2:1 |
| 18 | A | P | 1:2 |
| 19 | A | Q | 1:1 |
| 20 | A | Q | 1.5:2 |
| 21 | A | U | 1:1 |
| 22 | A | U | 2:1 |
| 23 | A | R | 2:3 |
| 24 | A | R | 4:3 |
| 25 | A | S | 1:1 |
| 26 | A | S | 2:1 |
| 27 | A | T | 1:1 |
| 28 | A | T | 2:1 |
| 29 | A | T | 1:2 |
| 30 | A | V | 1:1 |
| 31 | A | V | 60:40 |
| 32 | A | W | 1:1 |
| 33 | A | W | 1:2 |
| 34 | A | X | 1:1 |
| 35 | A | X | 2:1 |
| 36 | C | B | 1:1 |
| 37 | C | D | 1:1 |
| 38 | C | F | 1:1 |
| 39 | C | N | 1:1 |
| 40 | C | O | 1:1 |
| 41 | C | P | 1:1 |
| 42 | C | Q | 1:1 |
| 43 | C | R | 1:1 |
| 44 | C | S | 1:1 |
| 45 | C | T | 1:1 |
| 46 | C | U | 1:1 |
| 47 | C | V | 1:1 |
| 48 | C | W | 1:1 |
| 49 | C | X | 1:1 |
| 50 | E | B | 1:1 |
| 51 | E | D | 1:1 |
| 52 | E | F | 1:1 |
| 53 | E | N | 1:1 |
| 54 | E | O | 1:1 |
| 55 | E | P | 1:1 |
| 56 | E | Q | 1:1 |
| 57 | E | R | 1:1 |
| 58 | E | S | 1:1 |
| 59 | E | T | 1:1 |
| 60 | E | U | 1:1 |
| 61 | E | V | 1:1 |
| 62 | E | W | 1:1 |
| 63 | E | X | 1:1 |
| 64 | G | B | 1:1 |
| 65 | G | D | 1:1 |
| 66 | G | F | 1:1 |
| 67 | G | N | 1:1 |
| 68 | G | O | 1:1 |
| 69 | G | P | 1:1 |
| 70 | G | Q | 1:1 |
| 71 | G | R | 1:1 |
| 72 | G | S | 1:1 |
| 73 | G | T | 1:1 |
| 74 | G | U | 1:1 |
| 75 | G | V | 1:1 |
| 76 | G | W | 1:1 |
| 77 | G | X | 1:1 |
| 78 | H | B | 1:1 |
| 79 | H | D | 1:1 |
| 80 | H | F | 1:1 |
| 81 | H | N | 1:1 |
| 82 | H | O | 1:1 |
| 83 | H | P | 1:1 |
| 84 | H | Q | 1:1 |
| 85 | H | R | 1:1 |
| 86 | H | S | 1:1 |
| 87 | H | T | 1:1 |
| 88 | H | U | 1:1 |
| 89 | H | V | 1:1 |
| 90 | H | W | 1:1 |
| 91 | H | X | 1:1 |
| 92 | I | B | 1:1 |
| 93 | I | D | 1:1 |
| 94 | I | F | 1:1 |
| 95 | I | N | 1:1 |
| 96 | I | O | 1:1 |
| 97 | I | P | 1:1 |
| 98 | I | Q | 1:1 |
| 99 | I | R | 1:1 |
| 100 | I | S | 1:1 |
| 101 | I | T | 1:1 |
| 102 | I | U | 1:1 |
| 103 | I | V | 1:1 |
| 104 | I | W | 1:1 |
| 105 | I | X | 1:1 |
| 106 | J | B | 1:1 |

-continued

| Example | Component 1 | Component 2 | Ratio |
|---|---|---|---|
| 107 | J | D | 1:1 |
| 108 | J | F | 1:1 |
| 109 | J | N | 1:1 |
| 110 | J | O | 1:1 |
| 111 | J | P | 1:1 |
| 112 | J | Q | 1:1 |
| 113 | J | R | 1:1 |
| 114 | J | S | 1:1 |
| 115 | J | T | 1:1 |
| 116 | J | U | 1:1 |
| 118 | J | V | 1:1 |
| 119 | J | W | 1:1 |
| 120 | J | X | 1:1 |
| 121 | K | B | 1:1 |
| 122 | K | D | 1:1 |
| 123 | K | F | 1:1 |
| 124 | K | N | 1:1 |
| 125 | K | O | 1:1 |
| 126 | K | P | 1:1 |
| 127 | K | Q | 1:1 |
| 128 | K | R | 1:1 |
| 129 | K | S | 1:1 |
| 130 | K | T | 1:1 |
| 131 | K | U | 1:1 |
| 132 | K | V | 1:1 |
| 133 | K | W | 1:1 |
| 134 | K | X | 1:1 |
| 135 | L | B | 1:1 |
| 136 | L | D | 1:1 |
| 137 | L | F | 1:1 |
| 138 | L | N | 1:1 |
| 139 | L | O | 1:1 |
| 140 | L | P | 1:1 |
| 141 | L | Q | 1:1 |
| 142 | L | R | 1:1 |
| 143 | L | S | 1:1 |
| 144 | L | T | 1:1 |
| 145 | L | U | 1:1 |
| 146 | L | V | 1:1 |
| 147 | L | W | 1:1 |
| 148 | L | X | 1:1 |
| 149 | M | B | 1:1 |
| 150 | M | D | 1:1 |
| 151 | M | F | 1:1 |
| 152 | M | N | 1:1 |
| 153 | M | O | 1:1 |
| 154 | M | P | 1:1 |
| 155 | M | Q | 1:1 |
| 156 | M | R | 1:1 |
| 157 | M | S | 1:1 |
| 158 | M | T | 1:1 |
| 159 | M | U | 1:1 |
| 160 | M | V | 1:1 |
| 161 | M | W | 1:1 |
| 162 | M | X | 1:1 |
| 163 | A | Y | 1:1 |
| 164 | C | Y | 1:1 |
| 165 | E | Y | 1:1 |
| 166 | G | Y | 1:1 |
| 167 | H | Y | 1:1 |
| 168 | I | Y | 1:1 |
| 169 | J | Y | 1:1 |
| 170 | K | Y | 1:1 |
| 171 | L | Y | 1:1 |
| 172 | M | Y | 1:1 |
| 173 | N | Y | 1:1 |
| 174 | A | Z | 1:1 |
| 175 | C | Z | 1:1 |
| 176 | E | Z | 1:1 |
| 177 | G | Z | 1:1 |
| 178 | H | Z | 1:1 |
| 179 | I | Z | 1:1 |
| 180 | J | Z | 1:1 |
| 181 | K | Z | 1:1 |
| 182 | L | Z | 1:1 |
| 183 | M | Z | 1:1 |

What is claimed:

1. A dye mixture comprising one or more azo dyes of the formula (1) and one more azo dyes of the formula (2)

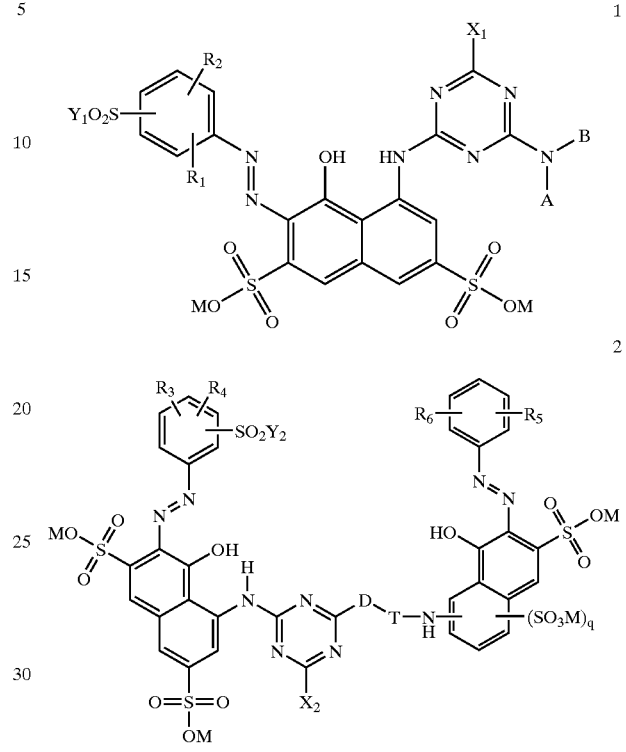

wherein

M is a hydrogen atom, an ammonium ion or the equivalent of an alkali earth metal or alkaline earth metal;

$X_1$ is fluoro, chloro, alkoxy, hydroxyl, cyanamido, amino, anilino, anilinesulfonic acid, anilinedisulfonic acid, toluidine, anisole, unsubstituted alkylamino hydroxyl-substituted alkylamino, sulfo-substituted alkylamino or sulfato-substituted alkylamino;

$X_2$ has any of the meanings of $X_1$;

$Y_1$ and $Y_2$ are independently each ethenyl or a moiety of the formula $CH_2CH_2Z$, wherein Z is a moiety that is eliminable by the action of alkali;

$R_1$, $R_2$, $R_3$, $R_4$, $R_5$ and $R_6$ are independently hydrogen, alkyl, alkoxy, sulfo, hydroxyl, cyano, chloro or bromo;

A is hydrogen; unsubstituted $C_1$–$C_6$-alkyl; $C_1$–$C_6$-alkyl substituted with sulfo, hydroxyl or sulfato; or N-A is unsubstituted aniline or aniline substituted with sulfo or halogen;

B is hydrogen; $CH_2CH_2SO_2Y$; unsubstituted alkyl; alkyl substituted with $SO_2Y$, —$OCH_2CH_2SO_2Y$ or —$SO_3M$; unsubstituted phenyl or phenyl substituted by up to three substituents selected from the group consisting of alkyl, alkoxy, sulfo, hydroxyl, cyano, chloro, bromo and $SO_2Y$, wherein M and Y are each as defined above;

A-N—B alternatively represents cyclic amines;

D-T is a direct bond; or

T is a sym-triazine substituted in position 2 by $X_3$, wherein $X_3$ has any of the meanings of $X_1$, and D is an alkylenediamino bridge of the formulae 3, 4, 5 and 6:

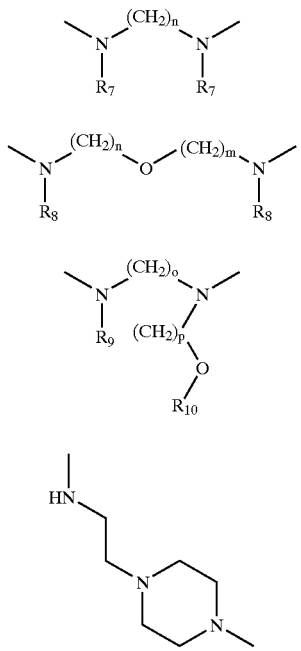

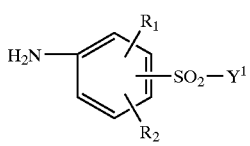

wherein n, m, o and p are independently each 1–8, q is selected from the group consisting of zero and one, $R_7$, $R_8$, and $R_9$ are independently $C_1$–$C_4$ alkyl, and $R_{10}$ is hydrogen or $SO_3M$.

2. The dye mixture as claimed in claim 1, wherein A-N—B is morpholino or piperazine.

3. The dye mixture as claim in claim 1, comprising one or more azo dyes conforming to the formula (1) and one or more azo dyes conforming to the formula (2) in a mixing ratio of 90:10% by weight to 10:90% weight.

4. The dye mixture as claimed in claim 1, comprising one or more azo dyes conforming to the formula (1) and one or more azo dyes conforming to the formula (2) in a mixing ratio of 70:30% by weight to 30:70% by weight.

5. The dye mixture as claimed in claim 1, comprising one or more azo dyes conforming to the formula (1) and one or more azo dyes conforming to the formula (2) in a mixing ratio of 65:35% by weight to 45:55% by weight.

6. A process for preparing the dye mixture as claimed in claim 1 which comprises mechanically mixing the individual components in solid or liquid form.

7. A process for preparing the dye mixture as claimed in claim 1, which comprises reacting a 2,4,6-trihalotriazine, with 1-amino-8-naphthol-3,6-disulfonic acid and then with a diazonium salt prepared from an amine of the formula (3A) or (3B)

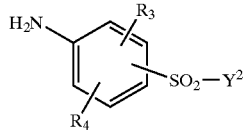
(3A)

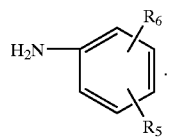
(3B)

wherein $Y_1$ and $Y_2$ are independently each ethenyl or a moiety of the formula $CH_2CH_2Z$, wherein Z is a moiety that is eliminable by the action of alkali;

$R_1$, $R_2$, $R_3$ and $R_4$, are independently hydrogen, alkyl, alkoxy, sulfo, hydroxyl, cyano, chloro or bromo;

then reacting the reaction product from the reaction with a diazotized amine of the formula (3A) by reaction with one or more amino compounds of the formula A-NH—B, wherein A is hydrogen; unsubstituted $C_1$–$C_6$-alkyl; $C_1$–$C_6$-alkyl substituted with sulfo, hydroxyl or sulfato; or N-A is unsubstituted aniline or aniline substituted with sulfa or halogen;

B is hydrogen; $CH_2CH_2SO_2Y$; unsubstituted alkyl; alkyl substituted with $SO_2Y$, —$OCH_2CH_2SO_2Y$ or —$SO_3M$; unsubstituted phenyl or phenyl substituted by up to three substituents selected from the group consisting of alkyl, alkoxy, sulfo, hydroxyl, cyano, chloro, bromo and $SO_2Y$, wherein M and Y are each as defined above;

A-N—B alternatively represents cyclic amines;, or to prepare the component of the formula (2) introducing the fragment D-T in a known manner in the reaction product from the reaction with a diazotized amino compound of the formula (3B), then reacting this reaction product with an amine of the formula (3C)

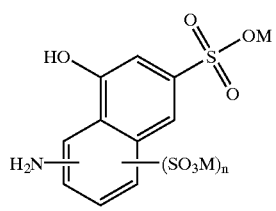
(3C)

and coupling with the diazonium salt of the amines of the formula (3D) to form the bisazo dye (3D)

8. The process as claimed in claim 7, wherein said 2,4,6-trihalotriazine is 2,4,6-trichlorotriazine or 2,4,6-trifluorotriazine.

9. A process for dyeing or printing hydroxyl- and/or carboxamido-containing material, which comprises applying the dye mixture as claimed in claim 1 to the material in dissolved form and fixing the dye mixture on the material by means of a) heat, b) with the aid of an alkaline agent or c) by means of both heat and the aid of an alkaline agent.

10. The process as claimed in claim 9, wherein said material is a fiber material.

11. The dye mixture as claimed in claim 1, wherein $X_1$ is chloro or fluoro.

12. The dye mixture as claimed in claim 11, wherein $R_1$, $R_2$, $R_3$, $R_4$ and $R_6$ are independently hydrogen, ethyl and methyl and $R_5$ is methyl, methoxy or sulfo.

13. The dye mixture as claimed in claim 1, wherein D-T is a direct bond.

14. The dye mixture as claimed in claim 1, wherein Z is of the formula —$OSO_3M$, of the formula —$SSO_3M$, of the formula —$OPO(OM)_2$ or chloro.

15. The dye mixture as claimed in claim 12, wherein Z is of the formula —$OSO_3M$, of the formula —$SSO_3M$, of the formula —$OPO(OM)_2$ or chloro and D-T is a direct bond.

16. The process as claimed in claim 7, wherein A-N—B is morpholino or piperazine.

* * * * *

UNITED STATES PATENT AND TRADEMARK OFFICE
CERTIFICATE OF CORRECTION

PATENT NO. : 6,916,350 B2
DATED : July 12, 2005
INVENTOR(S) : Joachim Steckelberg et al.

It is certified that error appears in the above-identified patent and that said Letters Patent is hereby corrected as shown below:

Column 28,
Line 25, delete "sulfa" and insert -- sulfo --.

Signed and Sealed this

Eighth Day of November, 2005

JON W. DUDAS
*Director of the United States Patent and Trademark Office*